(12) United States Patent
Robbins et al.

(10) Patent No.: US 8,568,259 B2
(45) Date of Patent: Oct. 29, 2013

(54) ENGINE ACCESSORY DRIVE WITH BELT TENSIONER AND SAME PLANE IDLER

(75) Inventors: Joseph E. Robbins, Mayville, MI (US); William C. Deneszczuk, Saline, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 793 days.

(21) Appl. No.: 12/557,589

(22) Filed: Sep. 11, 2009

(65) Prior Publication Data

US 2011/0065539 A1 Mar. 17, 2011

(51) Int. Cl.
*F16H 7/12* (2006.01)

(52) U.S. Cl.
USPC .......................................................... 474/135

(58) Field of Classification Search
USPC ......... 474/109, 110, 115, 117, 134, 135, 136, 474/137
See application file for complete search history.

(56) References Cited

U.S. PATENT DOCUMENTS

| | | | | |
|---|---|---|---|---|
| 6,857,979 | B2* | 2/2005 | Macnaughton et al. | 474/135 |
| 7,494,434 | B2* | 2/2009 | McVicar et al. | 474/109 |
| 8,057,334 | B2* | 11/2011 | Kotzur | 474/133 |
| 2002/0086751 | A1* | 7/2002 | Bogner et al. | 474/134 |
| 2003/0083164 | A1* | 5/2003 | MacNaughton et al. | 474/135 |
| 2006/0287146 | A1* | 12/2006 | McVicar et al. | 474/109 |
| 2007/0037648 | A1* | 2/2007 | Di Giacomo et al. | 474/134 |
| 2010/0331127 | A1* | 12/2010 | Dec et al. | 474/135 |

\* cited by examiner

*Primary Examiner* — William E Dondero
*Assistant Examiner* — Robert T Reese
(74) *Attorney, Agent, or Firm* — Cantor Colburn LLP

(57) ABSTRACT

A belt tensioner for a starter generator drive is provided. The belt tensioner comprises a carrier having a pivot defining a first pivot axis at a first end and a carrier arm extending from the pivot to terminate in a second end. An idler pulley is rotatably mounted to the carrier for rotation about the first pivot axis and a tensioner pulley is rotatably mounted to the carrier at the second end of the carrier arm for rotation about a second axis. The second axis extends parallel to and is arcuately moveable relative to, the first pivot axis. A tensioner is in communication with the second end of the carrier arm for biasing the carrier arm and the tensioner pulley against a drive belt for tensioning the drive belt engaged by the idler pulley and the tensioner pulley.

12 Claims, 3 Drawing Sheets

ENGINE ACCESSORY DRIVE WITH BELT TENSIONER AND SAME PLANE IDLER

FIELD OF THE INVENTION

This invention relates to internal combustion engines and, more particularly, to an engine accessory drive and drive belt tensioner for such drive.

BACKGROUND

Belt Alternator Starter ("BAS") powertrain systems for hybrid vehicles differ from conventional, non-hybrid systems in that the torque to turn the accessory drive belt and related accessories is not always generated from the engine crankshaft through the crankshaft pulley. During engine operation, the engine crankshaft provides torque for rotating a Motor Generator Unit ("MGU"), or electric starter generator unit, generally providing for taut and slack sides of the drive belt on opposite sides of the MGU pulley. During engine starting using the MGU, however, the MGU drives the accessory drive belt and related accessories causing the slack side of the belt to switch to the opposite side of the MGU pulley. Accordingly, belt tensioners are generally required in such systems as are idler pulleys that are used to shorten drive belt spans to minimize the potential for drive belt slack.

During engine driven operation of the MGU and other accessories, the loads placed on the drive belt are determined by the power required to drive the accessories, including the MGU unit. The accessory drive loads are relatively light and, accordingly, require moderate to low belt tensioning to avoid belt slippage. On the other hand, during engine starting using the MGU, the MGU must supply power to rotate the engine (crankshaft, pistons, camshafts, etc.) as well as the accessories. MGU driven engine starts require a significantly higher level of belt tensioning to control motion on the slack side of belt and assure that the belt will not slip. Because of packaging requirements it is common to provide separate tensioner and idler arms and pulleys with different pivot locations to attain the necessary drive belt geometry.

SUMMARY

In an exemplary embodiment, a belt tensioner for an engine mounted, belt driven component is provided. The belt tensioner comprises a carrier having a pivot defining a first pivot axis at a first end and extending from the pivot to terminate at a second end. An idler pulley is rotatably mounted to the carrier for rotation about the first pivot axis. A tensioner pulley is rotatably mounted to the carrier at the second end for rotation about a second axis. The second axis extends parallel to and is arcuately moveable relative to, the first pivot axis. A tensioner assembly is in communication with the second end of the carrier for biasing the carrier and the tensioner pulley against a drive belt for tensioning the drive belt engaged by the idler pulley and the tensioner pulley.

In another exemplary embodiment, an accessory drive for an engine having a belt-driven, electric starter-generator unit for driving and being driven by the engine is provided and comprises a first driven pulley connected with an engine crankshaft and rotatable therewith. A second driven pulley, connected with an electric starter-generator unit is mounted to the engine. A drive belt connects the first driven pulley and the second driven pulley for driving either pulley from the other pulley. A drive belt tensioner assembly comprises a carrier having a pivot at a first end, defining a first pivot axis, mounted to the engine for pivotal motion thereon and extending from the pivot to terminate in a second end. An idler pulley rotatably mounted to the carrier for rotation about the first pivot axis and to carry the drive belt thereon and a tensioner pulley rotatably mounted to the carrier at the second end for rotation about a second axis that extends parallel to, and is arcuately moveable relative to, the first pivot axis. A tensioner assembly is mounted to the engine and connected to the second end of the carrier to bias the carrier and the tensioner pulley about the first pivot axis for tensioning the drive belt.

In yet another exemplary embodiment, an engine system having a belt-alternator starter accessory drive system is provided and comprises an engine, a first driven pulley connected with a crankshaft and rotatable therewith and a second driven pulley connected with an electric starter-generator unit mounted to the engine. A drive belt connects the first driven pulley and the second driven pulley for driving either pulley from the other pulley. A drive belt tensioner assembly comprises a carrier having a pivot at a first end, defining a first pivot axis, mounted to the engine for pivotal motion thereon and extending from the pivot to terminate in a second end, an idler pulley rotatably mounted to the carrier for rotation about the first pivot axis and to carry the drive belt thereon and a tensioner pulley rotatably mounted to the carrier at the second end for rotation about a second axis that extends parallel to, and is arcuately moveable relative to, the first pivot axis. A tensioner assembly is mounted to the engine and connected to the second end of the carrier to bias the carrier and the tensioner pulley about the first pivot axis for tensioning the drive belt.

The above features and advantages, and other features and advantages of the present invention are readily apparent from the following detailed description of the best modes for carrying out the invention when taken in connection with the accompanying drawings.

BRIEF DESCRIPTION OF THE DRAWINGS

Other objects, features, advantages and details appear, by way of example only, in the following detailed description of embodiments, the detailed description referring the drawings in which.

DESCRIPTION OF THE EMBODIMENTS

Figure 1:
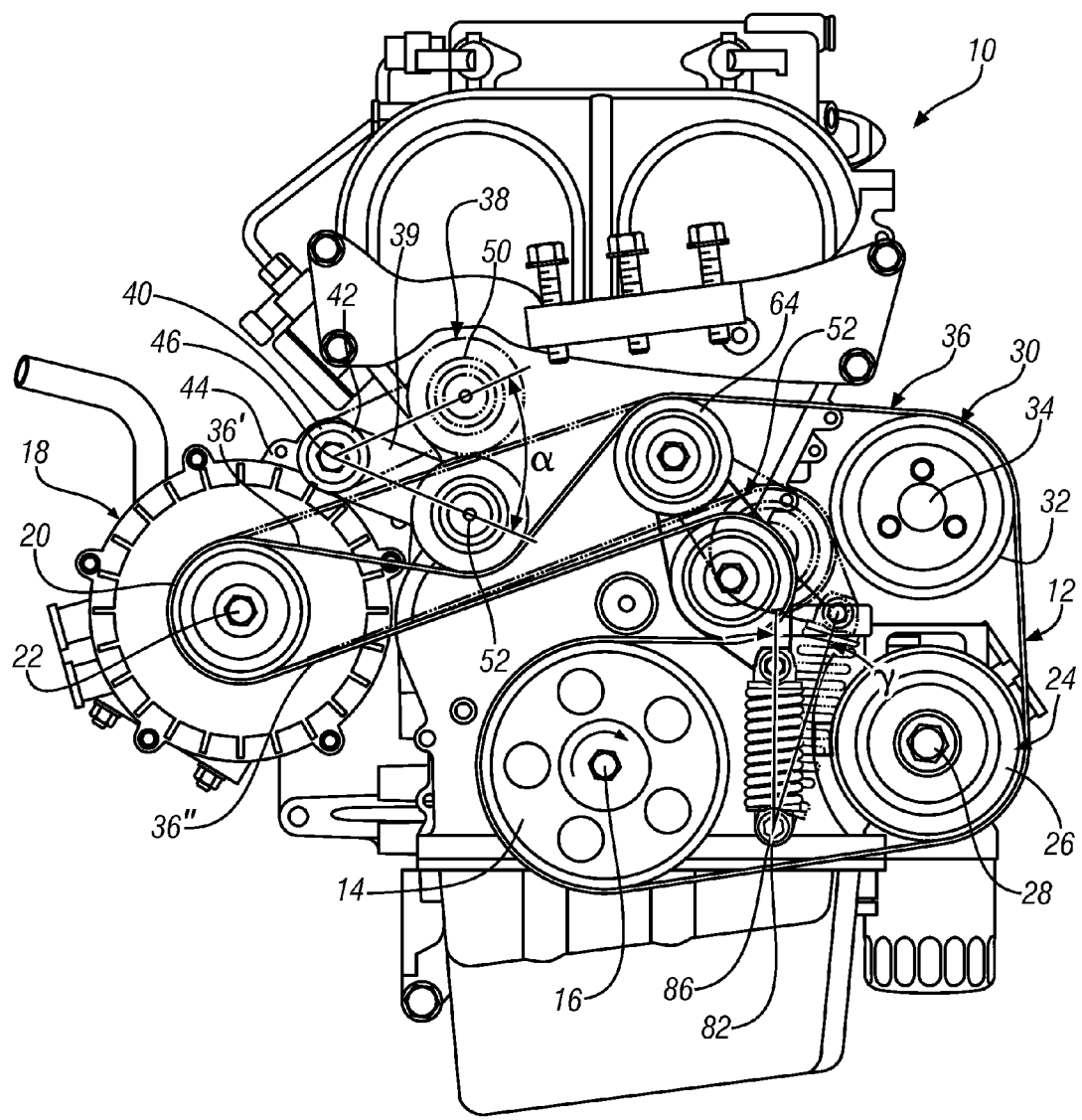
FIG. 1 is a front view of an engine system that embodies features of the present invention.
Figures 2, 3:
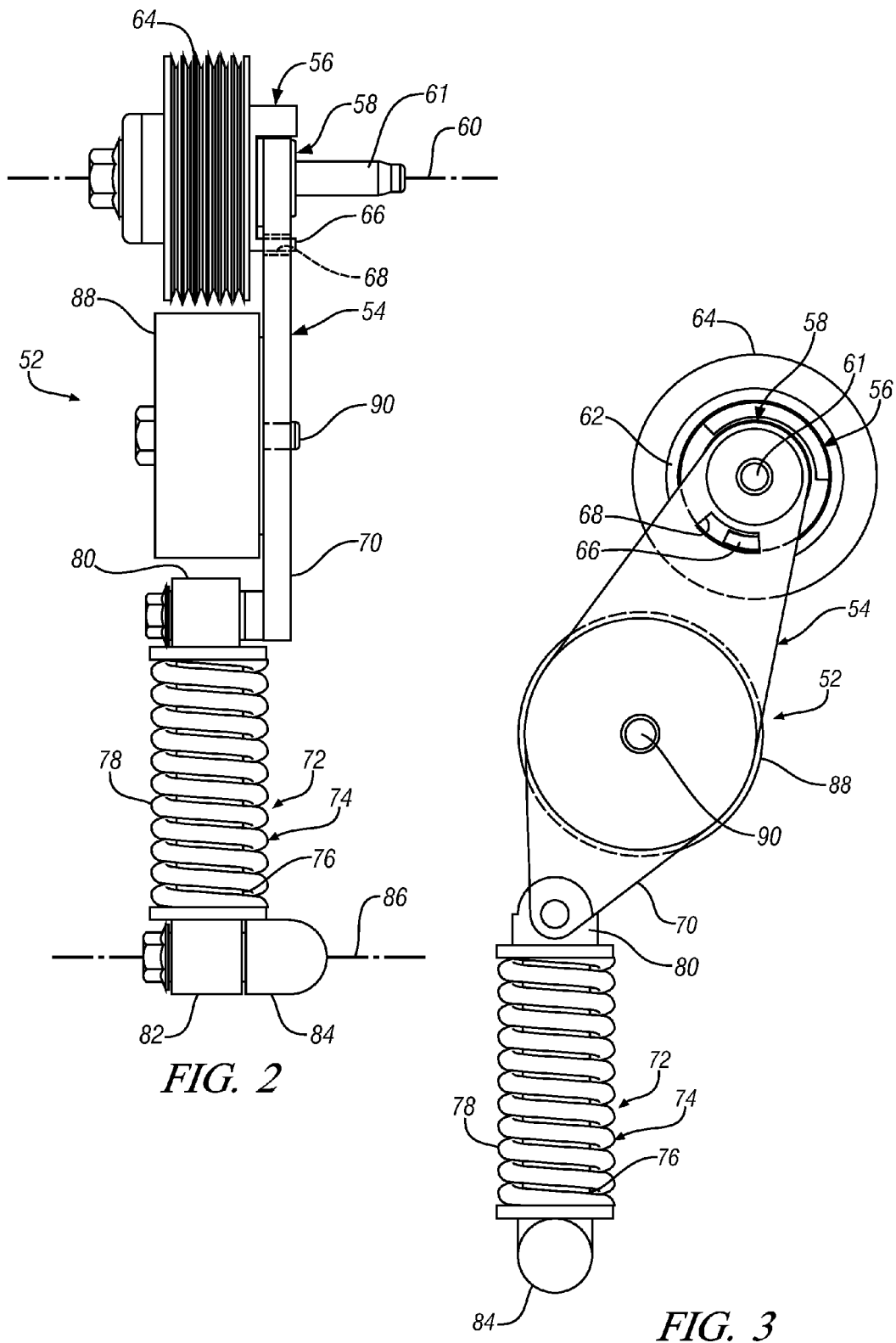
FIG. 2 is a side view of a drive belt tensioner assembly embodying features of the present invention.
FIG. 3 is a rear view of the drive belt tensioner assembly of FIG. 2.
Figure 4:
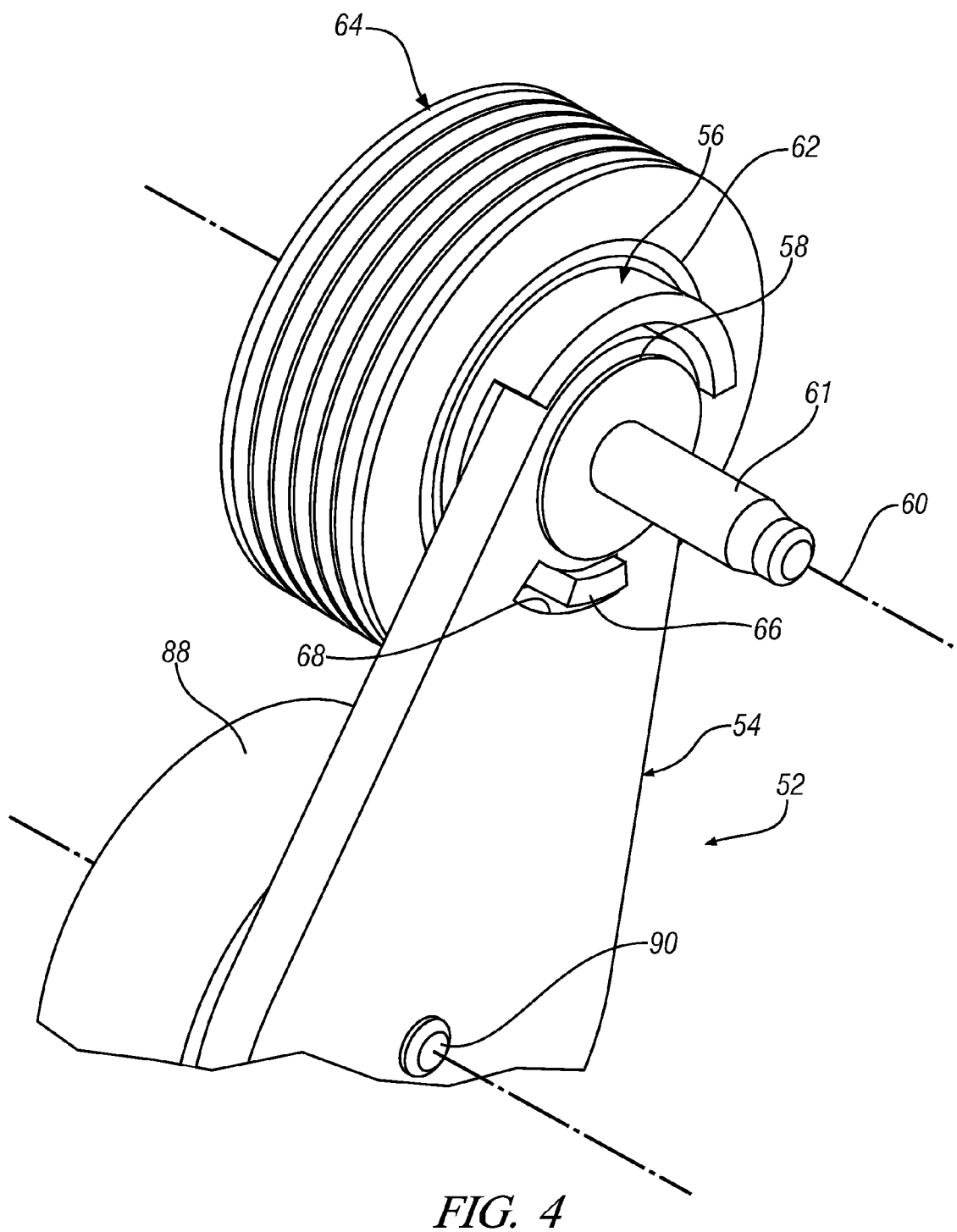
FIG. 4 is an enlarged partial perspective view of a portion of the rear of the drive belt tensioner assembly of FIG. 2.

The following description is merely exemplary in nature and is not intended to limit the present disclosure, application or uses. It should be understood that throughout the drawings, corresponding reference numerals indicate like or corresponding parts and features.

In accordance with an exemplary embodiment, FIG. 1 illustrates an engine 10, for a hybrid vehicle (not shown) having a Belt Alternator Starter ("BAS") accessory drive system 12. The BAS accessory drive system 12 includes an engine drive pulley 14 mounted for rotation on the end of an engine crankshaft 16. An electric starter generator unit, or Motor Generator Unit ("MGU") 18, includes an electric machine that can be driven to act as an electric generator and produce electric power, or use electric power to drive the engine 10 as a starter. MGU 18, operative as a starter or a generator, is mounted on the engine 10 at a lateral distance from the engine drive pulley 14 and includes an MGU drive pulley 20 mounted for rotation on the shaft 22 of the MGU rotor. An air conditioner compressor 24 may also be mounted on the engine 10 and includes an air compressor drive pulley 26 mounted for clutched rotation on the shaft 28 of the air conditioner compressor 24. In addition, a water pump 30 is mounted on the engine 10 and similarly includes a water pump drive pulley 32 mounted for rotation on the shaft 34 of the water pump 30. Other similarly mounted accessory components, such as an air pump (not shown) or a power steering pump (not shown), for instance, may also be associated with the BAS accessory drive system 12. A drive belt 36 is connected between and engages all of the pulleys 14, 20, 26, 32 for rotating together the engine crankshaft, the MGU, the air conditioner compressor, the water pump and any other optional accessories.

The MGU 18 serves both as a generator when the engine is running and producing mechanical power needed to spin the electric machine and convert the mechanical power into electrical power in a generating mode, and as a starting motor when the engine is off, the vehicle is operating in a hybrid mode, and the electric machine is used to spin the motor in a starting mode. The MGU 18 is driven by drive belt 36 in the generating mode but drives the belt in the starting or cranking mode. In the generating mode, the upper run 36' of the drive belt 36 is tight while the lower run 36" is slack. The situation is reversed during the starting or cranking mode so that the upper run 36' is slack, while the lower run 36" is tight. To properly tension the drive belt 36, the BAS accessory drive system 12 includes one or more tensioners and idler pulleys in order to prevent slippage of the drive belt when the MGU 18 is in either the driven or driving mode.

In an exemplary embodiment, a drive belt tensioner assembly 38 has an arm 39 having a first end 40 that is mounted at pivot 42 to a support boss 44 extending from the housing of the MGU 18. The pivot 42 allows pivotal motion of the tensioner arm 39 about an associated pivot axis 46. A second end of the tensioner arm 39 includes a tensioner pulley 50 mounted for rotation about an axis 52 that is parallel to the pivot axis 46 of the pivot 42. The tensioner pulley 50 of the tensioner assembly 38 is biased against the upper run 36' of the drive belt 36 by a biasing member (not shown) and operates through a range of rotation "α" to maintain a desired level of tension in the upper run 36' when the MGU is operating in the starting or cranking mode.

Referring to FIGS. 1-4, a centrally located drive belt tensioner assembly 52 is mounted to the BAS accessory drive system 12 and may be constructed as a pre-assembled unit. The drive belt tensioner assembly 52 includes a one-piece carrier 54 having a first end 56 that is mounted by pivot assembly 58 to a support boss (not shown) located on the engine assembly 10. The pivot assembly 58 allows pivotal motion of the one-piece carrier about an associated pivot axis 60. The pivot assembly may include a pivot mount 61 having a bearing assembly 62 disposed about its circumference and configured to support idler pulley 64 for rotation about the pivot axis 60. The bearing assembly 62 may include a counter balancing limiter 66 that extends into an arcuate slot 68 in the one piece carrier and operates to limit the rotation of the one piece carrier 54 about the pivot axis 60, as well as balancing clamping forces on the pivot assembly 58 when the tensioner/idler assembly 52 is mounted to the engine assembly 10.

Mounted to the second end 70 of the one piece carrier 54 of the drive belt tensioner assembly 52 is a tensioner assembly 72 in the form of a hydraulic strut 74 comprising a damped central hydraulic cylinder 76 surrounded by a compression coil spring 78. Tensioner assembly 72 is connected at an upper eye 80 to the second end 70 of the carrier 54 and extends to a lower eye 82 that, in assembly, is pivotally secured to a fixed support (not shown) of the engine 10 by the lower eye pivot mount 84. The lower eye pivot mount 84 allows pivotal motion of the tensioner assembly 72 about an associated lower eye pivot axis 86. The tensioner assembly 72 is configured so that the compression coil spring 78 continuously biases against the upper and lower eyes 80, 82 so as to bias the central hydraulic cylinder 76 in an extending direction toward which the central hydraulic cylinder is internally designed to move freely. However, the central hydraulic cylinder 76 includes internal velocity sensitive damping (not shown) that limits the rate of compression caused by forces which may act against it.

In an exemplary embodiment, a second tensioner pulley 88 is rotatably mounted to the one piece carrier 54 of the drive belt tensioner assembly 52, intermediate of the first and second ends 56, 70 respectively. The second tensioner pulley 88 rotates about pulley shaft 90 that is fixed to the carrier 54. The second tensioner pulley 88 of the drive belt tensioner assembly 52 biases the lower run 36" of the drive belt 36 due to the biasing force exerted on the second end 70 of the one piece carrier 54 and operates through a range of rotation "γ" to maintain a desired level of tension in the lower run 36" when the MGU 18 is operating in the driven mode; under power from the crankshaft 16. Additionally, the idler pulley 64, while not directly exerting a biasing force on the drive belt 36, operates to segment the long belt span between the MGU drive pulley 20 and the water pump drive pulley 32 thereby increasing the effectiveness of the tensioner assembly 38.

During normal operation of the engine assembly 10 (crankshaft driven MGU 18), the drive belt tensioner assembly 52 tensions drive belt span 36" with a force, determined by the spring rate of the compression coil spring 78, sufficient to take up any slack in the belt run while the tensioner assembly 38 rides against the drive belt 36 on the opposite side of the MGU drive pulley 20 on the tensioned belt span 36'. The positions of the tensioner assembly 38 and the tensioner idler assembly 52 remain relatively constant during normal, steady-state engine operation and the tensioner forces applied to the drive belt 36 are relatively moderate, though sufficient to control both belt runs 36' and 36" during such operation when the engine is driving the various accessories and the MGU 18. In this manner the forces that are acting on the bearing systems of the various pulleys and accessories are subject to moderate loads sufficient only to drive the accessories and the MGU 18 from the engine drive pulley 14.

During rapid engine speed changes during transient operation of the engine assembly 10 or, upon transition of the MGU 18 from the driven mode to the cranking or starting mode the biasing force of the compression coil spring 78 is insufficient to hold the second tensioner pulley 88 in position against the force generated on the lower belt run 36". Under the latter, relatively short period of operation of the BAS accessory drive system 12, the central hydraulic cylinder 76 applies a hydraulic damping force to the coil spring 78 that restrains contraction of the tensioner assembly 72 to a slow rate of change, thus applying velocity sensitive damping to the BAS accessory drive system 12 through the drive belt tensioner assembly 52. The central hydraulic cylinder 76 thus applies a restraining force opposing movement of the second tensioner pulley 88 resulting from the increase in torque applied on the belt 36 in the lower belt run 36" so that the second tensioner pulley 88 is allowed to move at only a very slow rate. In this operational mode, the initial position of the second tensioner pulley is changed a relatively small amount during the relatively short engine starting cycle in which the belt tension in the lower run 36" is significantly increased. At the same time, the tensioner pulley 50 is pivoted downwardly, FIG. 1, into the upper span 36' as necessary to take up the increased slack in the run while the engine is being started.

The arrangement of the drive belt tensioner assembly 52 is such that the second tensioner pulley 88 exerts a force on the drive belt 36 that is directed generally horizontally to the engine drive pulley 14 and, consequently, the engine crankshaft 16. A horizontal force is preferred to a vertically acting force in order to minimize the effects of wear on the crankshaft bearings (not shown). By providing a mechanism that includes a hydraulically damped tensioner pulley 88 married with a drive belt idler pulley 64, the drive belt tensioner assembly 52 reduces the space required in the BAS accessory drive system 12, which may be referred to as the "belt clearance zone", thereby allowing for ease of packaging the BAS accessory drive system 12 as well as reducing part count and reducing complexity. By driving all rotatable engine accessories on a single belt, which is provided for by the drive belt tensioner assembly 52 the capability of packaging engine driven accessories in a single belt plane is also realized. Elimination or avoidance of a second drive belt plane (two drive belts located in spaced axial relationship to one another) may reduce the length of an engine assembly 10 by several inches allowing for improved vehicle packaging opportunities.

Although the invention has been described primarily with reference to a BAS hybrid engine system is has been contemplated that there are applications for the invention in non-BAS systems that may require a high degree of short-term drive belt tensioning such as in higher performance engines in which rapid speed excursions may frequently be expected and, therefore the invention should not be limited to the descriptive embodiments included herein.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A drive belt tensioner assembly for an engine-mounted, belt-driven component, the tensioner assembly comprising:
    a carrier having a pivot defining a first pivot axis at a first end, the carrier extending from the pivot to terminate at a second end, the carrier mounted for rotation about the first pivot axis;
    an idler pulley rotatably mounted to the first end of the carrier for rotation about the first pivot axis;
    a tensioner pulley rotatably mounted to the second end of the carrier for rotation about a second axis, the second axis extending parallel to, and arcuately moveable relative to, the first pivot axis, the second axis being disposed a fixed distance from the first pivot axis; and
    a tensioner assembly in communication with the second end of the carrier and biasing the carrier and the tensioner pulley about the first pivot axis for tensioning a drive belt engaged by the idler pulley and the tensioner pulley.

2. The drive belt tensioner assembly for an engine-mounted, belt-driven component of claim 1, the tensioner assembly comprising:
    a biasing member exerting a biasing force on the carrier arm; and
    a dampening assembly associated with the biasing member to prevent rapid compression or extension of the tensioner assembly caused by transient input to the drive belt tensioner assembly by the drive belt.

3. The drive belt tensioner assembly for an engine-mounted, belt-driven component of claim 2, wherein the biasing member comprises a coil spring.

4. The drive belt tensioner for an engine-mounted, belt-driven component of claim 2, wherein the dampening assembly comprises a damped hydraulic strut.

5. An accessory drive for an engine having a belt-driven, electric starter-generator unit for driving and being driven by the engine, the accessory drive comprising:
    a first driven pulley connected with an engine crankshaft and rotatable therewith;
    a second driven pulley, connected with the electric starter-generator unit that is mounted in fixed relationship to the engine;
    a drive belt connecting the first driven pulley and the second driven pulley for driving either pulley from the other pulley;
    a drive belt tensioner assembly comprising:
    a carrier having a pivot at a first end, defining a first pivot axis, mounted to the engine for pivotal motion thereon and extending from the pivot to terminate in a second end, the carrier mounted for rotation about the first pivot axis;
    an idler pulley rotatably mounted to the first end of the carrier for rotation about the first pivot axis and to carry the drive belt thereon;
    a tensioner pulley rotatably mounted between the first end and the second end of the carrier for rotation about a second axis, the second axis extending parallel to, and arcuately moveable relative to, the first pivot axis, the second axis being disposed a fixed distance from the first pivot axis; and
    a tensioner assembly mounted in fixed relationship to the engine and connected to the second end of the carrier to bias the carrier and the tensioner pulley about the first pivot axis for tensioning the drive belt.

6. The accessory drive for an engine having a belt-driven, electric starter-generator unit for driving and being driven by the engine of claim 5, the tensioner assembly further comprising:
    a biasing member exerting a biasing force on the carrier; and
    a dampening assembly associated with the biasing member to prevent rapid compression or extension of the biasing member caused by transient input to the drive belt tensioner assembly by the electric starter-generator unit acting on the drive belt.

7. The accessory drive for an engine having a belt-driven, electric starter-generator unit for driving and being driven by the engine of claim 6, wherein the biasing member comprises a coil spring.

8. The accessory drive for an engine having a belt-driven, electric starter-generator unit for driving and being driven by the engine of claim 6, wherein the dampening assembly comprises a damped hydraulic strut.

9. An engine system having a belt alternator starter accessory drive system comprising:
    an engine;

a first driven pulley connected with an engine crankshaft and rotatable therewith;

a second driven pulley, connected with an electric starter-generator unit mounted to the engine;

a drive belt connecting the first driven pulley and the second driven pulley for driving either pulley from the other pulley;

a drive belt tensioner assembly comprising:

a carrier having a pivot at a first end, defining a first pivot axis, mounted to the engine for pivotal motion thereon and extending from the pivot to terminate at a second end, the carrier mounted for rotation about the first pivot axis;

an idler pulley rotatably mounted to the first end of the carrier for rotation about the first pivot axis and to carry the drive belt thereon;

a tensioner pulley rotatably mounted between the first end and the second end of the carrier at the for rotation about a second axis, the second axis extending parallel to, and arcuately moveable relative to, the first pivot axis, the second axis being disposed a fixed distance from the first pivot axis; and a tensioner assembly mounted to the engine and connected to the second end of the carrier to bias the carrier and the tensioner pulley about the first pivot axis for tensioning the drive belt.

10. The engine system having a belt alternator starter accessory drive system of claim 9, the tensioner assembly further comprising:

a biasing member exerting a biasing force on the carrier; and a dampening assembly associated with the biasing member to prevent rapid compression or extension of the biasing member caused by transient input to the drive belt tensioner assembly by the electric starter-generator unit acting on the drive belt.

11. The engine system having a belt alternator starter accessory drive system of claim 10, wherein the biasing member comprises a coil spring.

12. The engine system having a belt alternator starter accessory drive system of claim 10, wherein the dampening assembly comprises a damped hydraulic strut.

* * * * *